Figure 1:
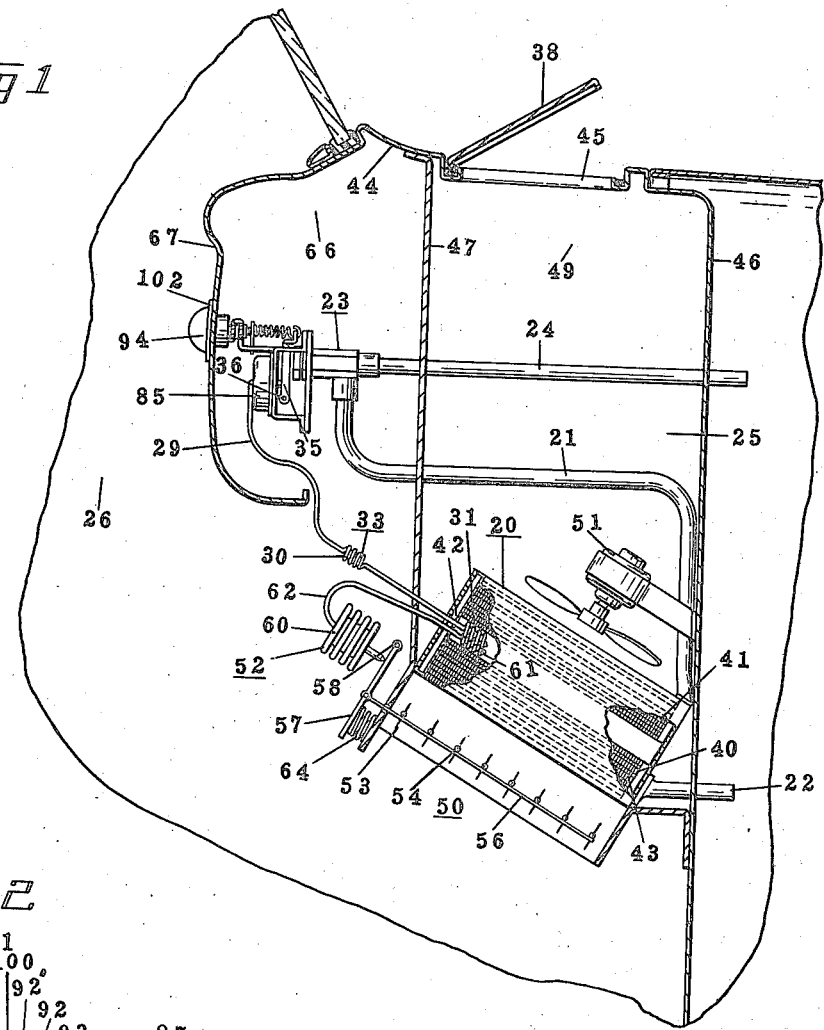

July 1, 1941.  E. D. RANEY  2,247,405

CONTROL APPARATUS

Filed April 28, 1938

INVENTOR
Eldon D. Raney
BY
Warren H. F. Schmerling
ATTORNEY

Patented July 1, 1941

2,247,405

UNITED STATES PATENT OFFICE 2,247,405

CONTROL APPARATUS

Eldon D. Raney, Columbus, Ohio, assignor to Ranco Incorporated, Columbus, Ohio, a corporation of Ohio Application April 28, 1938, Serial No. 204,823

5 Claims. (Cl. 236—37)

The present invention relates to thermostatic control apparatus and more particularly to apparatus for controlling the temperature of the air within an enclosure.

One of the objects of the present invention is to provide a control apparatus for a heat interchanger in which the temperature of the heat interchanger is regulated in response to the temperature of the air within the enclosure and also in response to the temperature of the air adjacent to or the air directly emanating from the heat interchanger.

Another object of the invention is to provide a control apparatus as heretofore mentioned which control apparatus includes a closed system containing a volatile fluid in which the pressure changes of the volatile fluid, due to changes in temperature thereof, is utilized for controlling the temperature of the heat interchanger and which system includes a plurality of condensers, one of which is responsive to the temperature of the air within the enclosure and the other of which is responsive to the temperature adjacent to or the air directly emanating from the heat interchanger.

A further object of the present invention is to provide a damper and a thermostatic control for the damper for limiting the flow of air from the outside to inside the enclosure until the heat interchanger is effective to function to change the temperature toward the normal desired temperature within the enclosure.

Other and further objects and advantages will be apparent from the following description, reference being had to the accompanying drawing wherein a preferred form of embodiment of the present invention is clearly shown.

Figure 2:
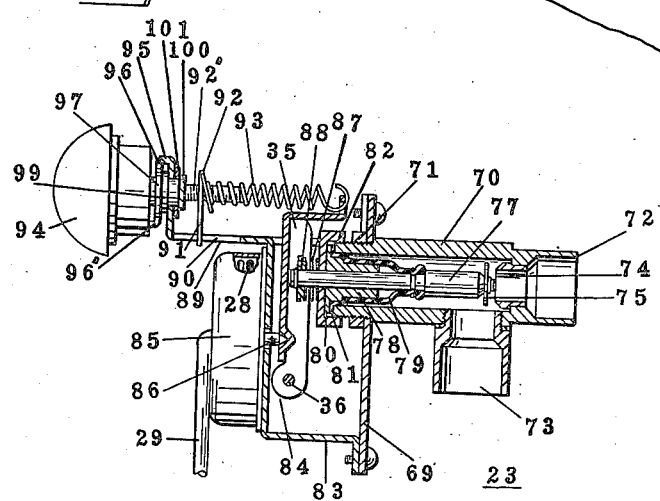

In the drawings:

Fig. 1 is a fragmentary side view of an automobile partly in section showing my improved invention applied to the heating system for a vehicle; and, Fig. 2 is a view of one of the controllers for the heat interchanger including the motor for actuating the same, the valve of the controller being shown in section.

Referring to the drawing there is shown a heat interchanger 20. Liquid is delivered to the heat interchanger 20 by a pipe 21 and leaves by a pipe 22. The flow of liquid is controlled by an inlet valve 23 connected between an inlet pipe 24 and pipe 21. The heat interchanger 20 is disposed within a duct 25 which forms an inlet to an enclosure 26. All air or substantially all air flowing from the duct 25 into the enclosure 26 must pass through the heat interchanger 20.

A thermostatic system is employed to control the valve 23. This thermostatic system includes a bellows type diaphragm 28, tube 29 and spiral type bulbs 30 and 31. These elements are formed of thin metal and therefore the bulbs are highly sensitive to heat changes. This thermostatic system contains a volatile fluid such as methyl chloride or sulphur dioxide and the bulbs 30 and 31 function as condensers. This thermostatic system will be referred to hereinafter as thermostatic system 33. The movable end of the bellows 28 is operatively connected with the valve 23 through a lever 35 which is pivoted at 36. When, for example, the invention is applied to a heating system, as herein shown, the decreasing pressure in the thermostatic system 33 is utilized for opening the valve 23. As will more fully appear hereinafter, the pressure of the circulating heating liquid and a spring urge valve 23 toward its open position.

The condenser 30 is disposed in the enclosure 26 remote from the heat interchanger 20, where it is more responsive to the mean temperature of the enclosure, while the condenser 31 is disposed adjacent a relatively cold part of the heat interchanger 20.

Heat continuously leaks out of the enclosure 26 or may be absorbed and therefore it is desirable to supply heat continuously to the enclosure. If for example, the enclosure is to be maintained at 70 degrees Fahrenheit, then, the air leaving the heat interchanger 20 should be considerable warmer than that temperature to compensate for such heat losses. In the present embodiment the thermostatic system 33 contains sufficient fluid that part thereof will be in a liquid state at approximately 90 degrees Fahrenheit but above that temperature it will all be in a gaseous state. Hence, at temperatures at which the heat interchanger is normally in operation, the fluid will be partially liquid and partially vapor. Since the thermostatic system 33 contains only a limited quantity of liquid, all liquid will be contained within the colder of the two condensers. The valve 23 is adjusted so that when both of the condensers 30 or 31 are above 70 deg. F., for example, the valve will be closed due to the vapor pressure in the system. When either of the condensers fall below 70 deg. F. a small amount of liquid condenses therein, decreasing the pressure in the system 33 to cause opening of the valve. The amount of liquid condensed to cause opening of the valve will be slight and will adhere to the walls of the condensers by capillary attraction. Thus if the mean enclosure temperature is 70° F. and the air passing over the condenser 31 is above 70° F. then all of the liquid in system 33 will be contained in condenser 30. Now if the temperature within enclosure 26 increases above that desired, the pressure within system 33 will increase and cause bellows 28 to move the valve 23 toward closed position whereby the flow of liquid through the heater 20 is decreased. Consequently the heater will receive sufficient hot liquid to maintain the enclosure at the desired temperature. The conditions may be such that the air directly emanating from the heater will pass over the occupant in the form of a draft. In that event, the temperature of the air, passing over the occupant in the form of a draft, must be considerably higher than 70° F. for comfort. In order to prevent this draft from causing uncomfortableness, it is maintained above a predetermined minimum temperature. This is accomplished by placing the condenser 31 at a relatively cold part of the heater 20. When the temperature of condenser 31 is cooled below the temperature of condenser 30, all of the liquid will condense in the former and it will then assume control of the thermostatic system 33. Let it be presumed that the thermostatic system, through condenser 30, is to maintain a temperature of 70° F. in the enclosure 26 but the conditions are such that this temperature is increased above that desired. The thermostatic system will decrease the flow of liquid through the heater and the conditions may be such that the flow of liquid is impeded to such extent that the air directly emanating from the heater is too cold for the comfort of an occupant in the direct path thereof. The condenser 31, however, is placed at such position that it prevents overcooling of the heater 20. As soon as its temperature falls below the temperature of condenser 30, it will assume control and the thermostatic fluid being condensed therein, due to the decrease in temperature, will cause the thermostatic system to increase the opening of valve 23 whereby more heating liquid will be delivered to the heater 20.

Under extremely cold outside environment, it may be desirable to decrease the amount of air flowing over the heater and under relatively warm outside environment, it may be desirable to increase the amount of air flowing over the heater. A damper 38 may be adjusted in a plurality of open positions.

The heat interchanger 20 is formed in two sections 40 and 41 connected in series circuit relation by a coupling piece 42. The sections may be of serpentine tube type or header and parallel tube type but in either construction the tube or tubes are provided with a plurality of fins 43. The sections are arranged so that air passes first through section 41. In this manner the temperature of the air is more uniform through the entire discharge area of the heater. The condenser 31, in the present embodiment, is disposed adjacent the liquid outlet end of the section 41 and is disposed so as to be responsive to the air directly emanating from the liquid outlet end of section 41. This place is more sensible to changes in temperature of the heater.

The present invention is particularly applicable to automobiles for heating and controlling the temperature within the passenger compartment. The pipe 24 is connected to a hot water outlet of the water-type cooling system of the internal combustion engine of the automobile and the pipe 22 is connected to a water inlet of the engine. The air duct 25 is formed underneath the cowl 44 of the car body and receives air through the cowl ventilator opening 45. The cover for the ventilator forms the damper 38 which may be opened to various positions or closed entirely by the usual cowl ventilator levers and latches now in use on automobiles. The duct 25 includes the body wall 46, a rear wall 47 and opposite side walls, one of which is shown at 49 in Fig. 1.

The ventilator cover 38 can be closed during the period when the heater 20 is warming and after that period it is opened. The condenser 31 will be warm but if the passenger compartment 26 is cold, condenser 30 will have control of the thermostatic system because only gas will be present in the condenser 31 while liquid will be present in the condenser 30. As long as condenser 30 is cold, valve 23 will be wide open but as the temperature of the compartment increases toward that normally desired, liquid in the condenser 30 volatilizes, increasing the pressure to move the valve 23 toward its closed position. Should the temperature fall again in the compartment, condensation of more gas in the condenser 30 will decrease the pressure in the system 33 causing the valve to open to a greater extent. Thus the system 33 will sustain the rate of flow of liquid necessary to maintain the compartment at the temperature desired. As previously stated, the condenser 31 will assume control in the event that the passenger compartment 26 is overheated. The arrangement is such that condenser 31 assumes control before the draft of air, striking the legs of the occupant of the front seat of the car, falls to a temperature too low for comfort. The condenser 31 is placed in a relatively cold zone i. e. in a zone in which the air passing therethrough has been partly heated but which after passing through said zone is heated further. In the present embodiment, the air passing over the zone containing condenser 31 is further heated by the section 40. Therefore, under certain conditions, the temperature of the zone containing condenser 31 will fall to less than the temperature desired in compartment 26 and due to the fact that this air will be further heated by section 40, the air striking the legs of the occupant of the front seat will not be too cold for comfort. Before the temperature falls to this too cold condition, the condenser 31 will have assumed control of the thermostatic system 33 to increase the flow of liquid through the heater and likewise increase the heating of the air.

It is desirable to continually supply fresh air to the passenger compartment and permit air to enter only through the heater. Therefore a slight air pressure should be maintained in the passenger compartment. A fan 51 may be employed to insure the delivery of sufficient air to maintain the slight air pressure, but ordinarily sufficient air will be forced into the car during movement thereof. The air leaves the passenger compartment 26 through cracks about the doors, windows, floor or one or more of the rear windows may be opened slightly.

Under extreme conditions such as extreme cold environment or high car speed or when the environment is relative warm or the car is driven at a relatively slow speed, it may be necessary to decrease or increase the rate of flow of air through the heater in order to obtain desired temperature in the compartment and a comfortable temperature about the legs of the occupant of the front seat. This rate of flow can be controlled by adjusting the position of the ventilator cover 38.

If it is desirable to control the flow of air automatically, this can be accomplished by a damper 50 controlled by a thermostatic system 52. The damper comprises a plurality of shutters 53, pivoted at 54, and which control the flow of air through the heater 20. These shutters 53 are actuated by a rod 56 and a lever 57. Lever 57 is pivoted at 58 and is moved to open the shutters 53 by expansion of a bellows 60 of the thermostatic system 52. This system also includes a spiral type bulb 61 connected with the bellows 60 by a tube 62. This system contains an expansible fluid such as methyl chloride or sulphur dioxide and contains sufficient fluid that part thereof will be in a liquid state at approximately 90 degrees Fahrenheit but above that temperature it will all be in a gaseous state. The bulb 61 is disposed adjacent condenser 31 and therefore functions as a condenser. The shutters are urged toward closed position by a spring 64 and retain the damper 50 closed until the temperature of the heater has attained a predetermined value at which time the fluid in the thermostatic system 52 will have expanded sufficiently to open the damper. Likewise the spring 64 will cause the rod 56 to gradually close the shutters 53 as the temperature of the heater 20 decreases. Preferably the system 52 and spring 64 are arranged and adjusted so that the damper 50 is opened wide before the heater 20 is increased to its normal temperature. Thus the damper prevents the ingress of air into the compartment or enclosure 26 when the heater is too cold to be appreciably effective.

Preferably the valve 23 is disposed in a compartment 66 in front of the instrument panel 67 whereby a knob on the panel can be used for selecting the temperature desired in the passenger compartment.

The liquid valve 23 and the adjusting mechanism for the thermostatic system 33 is shown in detail in Fig. 2 wherein a supporting frame 69 which is suitably attached to the instrument panel 67 or a part of the automobile. A valve body 70 is clamped to the frame 69 by a nut 71 threaded on the valve body. The pipe 24 is connected to the section 72 of the body 70 and the pipe 21 is connected to the section 73. The seat of the valve is shown at 74 and the valve proper comprises a disc 75 which is arranged to engage the seat 74 or otherwise vary the rate of flow of liquid from the section 72 to the section 73. Valve 75 is carried by a stem 77 which passes through a bushing 78 and is sealed by a rubber tube 79. This tube has one end thereof hermetically joined with the stem 77. The bushing 78 and the rubber tube 79 are provided with outwardly extending flanges 80 and 81 respectively and these flanges are hermetically joined with the valve body 70 by the gland 82. The frame 69 includes a bracket 83 which is suitably secured to the frame or plate 69 and is provided with two ears 84. These ears 84 are spaced from one another and the lever 35 is disposed between the same and is pivoted on a pin 36 carried by the ears. The lever 35 abuts the end of the valve stem 77 and is adapted to move the valve 75 toward and onto the seat 74.

The bracket 83 carries a bellows housing 85, enclosing the bellows 28 and the movable wall of the bellows carries a pin 86 which abuts the lever 35. Increase in pressure in the bellows 28 causes the lever 35 to move the valve 75 toward the closed position. The valve is urged toward its open position by pressure of the circulating liquid and by a spring 87, being interposed between the gland 82 and a disc 88 fastened to the stem 77.

The bracket 83 includes an extension 89 which is provided with a slot 90 for receiving a finger 91 of a nut 92. The nut is threaded on a screw 92' and also carries one end of a spring 93. The other end of the spring 93 is attached to the lever 35. The screw 92' extends through an opening in the extension 89 and carries a knob 94. When the screw 92' is turned by the knob 94, the nut is prevented from turning by the finger 91 and therefore when the knob 94 is turned the tension of the spring 93 is varied whereby the pressure at which the bellows 28 controls the valve 75 can be varied. An ear 95 on the extension 89 cooperates with an ear 96 on a plate 97 to limit the movement of the knob and likewise limit the adjustment of the spring 93. The ear 96 is formed on the plate 97 which is secured to the screw 92'. This plate 97 also includes an ear 96' suitably attached to the knob 94. An extending shoulder in the form of a ring 99 is formed integrally with the screw 92' and is disposed on one side of the extension 89. A nut 100 forming a shoulder is threaded on the screw 93 and is disposed on the other side of the extension 89. A spider type leaf spring 101 is interposed between the nut 100 and the extension 89 and the nut 100 is adjusted so that the shoulder 99 is frictionally held in engagement with the extension 89 to prevent accidental rotation of the screw 92'. The screw 92' extends through the panel 67 so that the knob 94 is readily accessible for one sitting in the driver's seat. The knob 94 is provided with a marker which is arranged to register with indicia on dial 102. This indica may be in the form of temperature markings.

It is desirable to place the valve 23 on the inlet side of the heater 20 for the reason that the temperature of the liquid at that point is more nearly uniform than at the outlet of the heater and also for the reason that the liquid pressure is more uniform at the inlet than at the outlet of the heater. Automobiles, particularly those which are to be equipped with car heaters, are usually provided with a temperature regulating valve which controls the amount of water that passes through the radiator, so as to maintain the temperature of the water around the engine block substantially constant. Therefore, the temperature of the valve 23 and the bellows 28, which is subjected to the environment of the valve 23 are maintained substantially constant and consequently the pressure changes in the thermostatic system 33 is governed substantially entirely by the temperature of the condenser 30 and 31.

Preferably a slight air pressure is maintained in the passenger compartment, whereby fresh air is continuously driven into the compartment and air is expelled through outlets in the compartment so that the relative humidity of the passenger compartment is maintained low, and therefore there will be no fogging of the glass windshield or windows.

From the foregoing it will be seen that I have provided a system in which the heat interchanger is controlled from two points by a thermostatic system and that such control is particularly advantageous in heat exchange system wherein a mean temperature of a certain valve is desirable and wherein an air draft of a different temperatures must be controlled also. The automobile embodiment, herein disclosed, is merely illustrative of one form of advantageous use of the present invention.

Another advantage of the present invention is the conjoint control of the heat exchange system in which the heat interchanger is ineffective until it is brought to a temperature at which it is appreciably effective and is thereafter controlled to maintain the desired heat exchange effect.

While the form of embodiment of the present invention as herein disclosed constitutes a preferred form, it is to be understood that other forms might be adopted, all coming within the scope of the claims which follow:

I claim:

1. In combination, means forming an inclosure for air; a heat interchanger associated with the inclosure for affecting the temperature of the air in the inclosure; means operable for attaining a desired temperature of air within the inclosure and operable after said desired temperature is attained, for preventing the temperature of the air emanating from the heat interchanger from varying beyond a certain temperature, said last means including a controller for changing the rate of heat exchange between the heat interchanger and the air, and a pressure responsive device for regulating the controller; said pressure responsive device having condensing means connected therewith, said device and condensing means containing a heat responsive fluid, said fluid being partially liquid and partially vapor when the heat exchange system is operating normally, said condensing means having a plurality of portions spaced from one another, the relative amounts of liquid and its vapor being so proportioned that substantially all of said liquid is adapted to be contained in one or the other of said condenser portions whereby the controller is responsive substantially solely to the temperature of the colder condenser portion, one of said condenser portions being disposed to be affected by the temperature of the air in the inclosure remote from the heat interchanger and the other condenser portion being disposed to be more directly affected by the temperature of the air subjected to the heat interchanger.

2. In combination, means forming an inclosure for air, said means having an air inlet; a heat interchanger in heat exchange relation with the air flowing into the inclosure; means operable for attaining a desired temperature of air within the inclosure and operable after said desired temperature is attained, for preventing the temperature of the air emanating from the heat interchanger from varying beyond a certain temperature, said last means including a controller for changing the rate of heat exchange between the heat interchanger and the air, and a pressure responsive device for regulating the controller; said pressure responsive device having condensing means connected therewith, said device and condensing means containing a heat responsive fluid, said fluid being partially liquid and partially vapor when the heat exchange system is operating normally, said condensing means having a plurality of portions spaced from one another, the relative amounts of liquid and its vapor being so proportioned that substantially all of said liquid is adapted to be contained in one or the other of said condenser portions whereby the controller is responsive substantially solely to the temperature of the colder condenser portion, one of said condenser portions being disposed to be affected by the temperature of the air in the inclosure remote from the heat interchanger and the other condenser portion being disposed to be affected by a temperature intermediate the temperature of the air before it is affected by the heat interchanger and the temperature of the air fully affected by the heat interchanger.

3. In combination, means forming an inclosure for air; a heater for affecting the temperature of the air in the inclosure, means operable for attaining a desired maximum temperature of air within the inclosure and operable, after said desired maximum temperature is attained, for maintaining the temperature of the air emanating from the heater, at a desired maximum temperature, said last means including a controller for changing the rate of heat exchange between the heater and the air, and a pressure responsive device for regulating the controller; said pressure responsive device having condensing means connected therewith, said device and condensing means containing a heat responsive fluid, said fluid being partially liquid and partially vapor when the heat exchange system is operating normally, said condensing means having a plurality of portions spaced from one another, the relative amounts of liquid and its vapor being so proportioned that substantially all of said liquid is adapted to be contained in one or the other of said condenser portions whereby the controller is responsive substantially solely to the temperature of the colder condenser portion, one of said condenser portions being disposed to be affected by the temperature of the inclosure remote from the heater and the other condensing portion being disposed to be more directly affected by the air subjected to the heater.

4. In combination, means forming an inclosure for air, said means having a cool air inlet; a heater for heating the air flowing into the inclosure, means operable for attaining a desired maximum temperature of air within the inclosure and operable, after said desired maximum temperature is attained, for maintaining the temperature of the air, emanating from the heater, at a desired maximum temperature, said last means including a controller for changing the rate of heat exchange between the heater and the air, and a pressure responsive device for regulating the controller; said pressure responsive device having condensing means connected therewith, said device and condensing means containing a heat responsive fluid, said fluid being partially liquid and partially vapor when the heat exchange system is operating normally, said condensing means having a plurality of portions spaced from one another, the relative amounts of liquid and its vapor being so proportioned that substantially all of said liquid is adapted to be contained in one or the other of said condenser portions whereby the controller is responsive substantially solely to the temperature of the colder condenser portion, one of said condenser portions being disposed to be affected by the temperature of the air in the inclosure remote from the heater and the other condensing portion being disposed to be affected by a temperature intermediate the temperature of the air before it is affected by the heater and the temperature of the air fully affected by the heater.

5. In combination, an automobile having a closed passenger compartment having an air inlet; a heating system for the compartment including a heat exchanger associated with the air inlet for heating the air flowing through the inlet, means for controlling the temperature of the heat exchanger including a valve, a pressure responsive expansible device for actuating the valve, a tube communicating with the device, said tube and device containing a volatile fluid, a portion of said tube being affected by the air which is intimately subjugated to changes in temperature of the heater and another portion of the tube being affected by the temperature of the air in the compartment remote from the heater, the volume of the fluid being such that it is partly vapor and partly liquid and all of the liquid is retainable in the colder of the two portions during normal operating temperatures of the system whereby the pressure responsive device is responsive solely to the colder of said two portions.

ELDON D. RANEY.